A. HOLSEY.
FERTILIZER ATTACHMENT FOR CORN PLANTERS.
APPLICATION FILED SEPT. 26, 1913.

1,218,773.

Patented Mar. 13, 1917.
3 SHEETS—SHEET 1.

Witnesses:
J. N. Daggett.

Inventor.
Arthur Holsey.
by Chas. E. Lord
Atty.

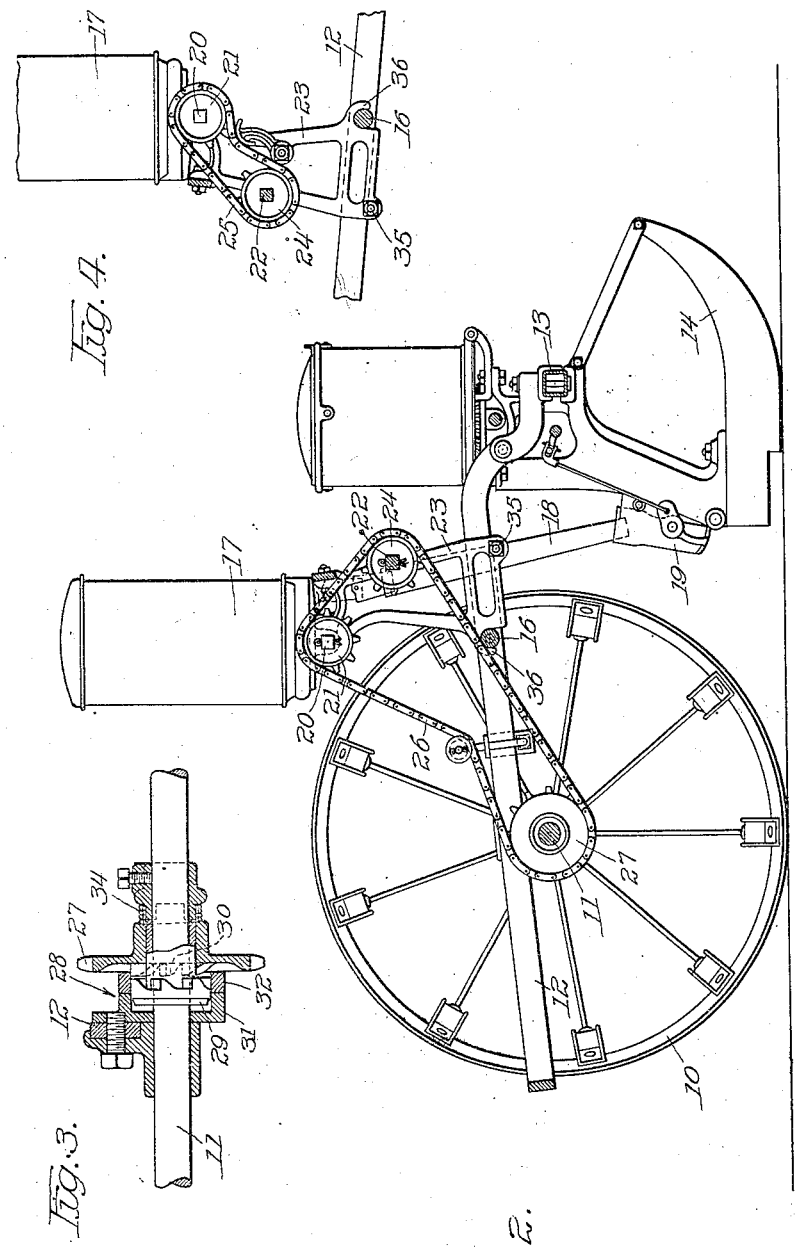

A. HOLSEY.
FERTILIZER ATTACHMENT FOR CORN PLANTERS.
APPLICATION FILED SEPT. 26, 1913.

1,218,773.

Patented Mar. 13, 1917.
3 SHEETS—SHEET 3.

Inventor.
Arthur Holsey.
By:
Chas. E. Lord
Atty.

UNITED STATES PATENT OFFICE.

ARTHUR HOLSEY, OF CHICAGO, ILLINOIS, ASSIGNOR TO INTERNATIONAL HARVESTER CORPORATION, A CORPORATION OF NEW JERSEY.

FERTILIZER ATTACHMENT FOR CORN-PLANTERS.

1,218,773.  Specification of Letters Patent.  Patented Mar. 13, 1917.

Application filed September 26, 1913. Serial No. 791,940.

*To all whom it may concern:*

Be it known that I, ARTHUR HOLSEY, a citizen of the United States, residing at Chicago, in the county of Cook and State of Illinois, have invented certain new and useful Improvements in Fertilizer Attachments for Corn-Planters, of which the following is a full, clear, and exact specification.

My invention relates to fertilizer attachments for corn planters, and more particularly to a new form of driving mechanism therefor.

In many types of seed planters the frame adjusting lever is located forwardly of the carrying frame, and by reason of this a special form of driving mechanism must be provided for the fertilizer attachment in order to obtain the desired position on the planter for the fertilizer containers. A planter of the type referred to is disclosed in the patent to Samuel K. Dennis, No. 1,001,736, August 29, 1911, seed planters; wherein it is found desirable to locate the frame adjusting lever near the front end of the carrying frame in order to make provision for a foot attachment. The usual driving mechanism for fertilizer attachments consists of a straight shaft arranged transversely of the planter frame, between the containers, and driven from the axle of the carrying wheels. However, with the frame adjusting lever positioned forwardly of the carrying frame, a driving shaft so arranged would interfere with the operation of said lever.

It is the object of my invention to improve the construction and operation of a fertilizer attachment for seed planters and to provide a new form of driving mechanism therefor which will permit the frame adjusting lever of the planter to be strategically located near the forward end of the carrying frame and moved the necessary distance without interference. This object I accomplish by means of separate shafts for each of the containers driven from a countershaft located forwardly of the containers and extending across the planter frame, said countershaft being driven from the axle of the carrying wheels.

One form which my invention may assume is exemplified in the following description and illustrated in the accompanying drawings, in which—

Fig. 2 shows a vertical sectional view taken on line 2—2 of Fig. 1;

Fig. 3 shows a detail sectional view taken on line 3—3 of Fig. 1, illustrating the clutch mechanism employed in my device;

Fig. 4 shows a detail view of the fertilizer container and driving mechanism therefor opposite that shown in Fig. 2.

Figure 1:
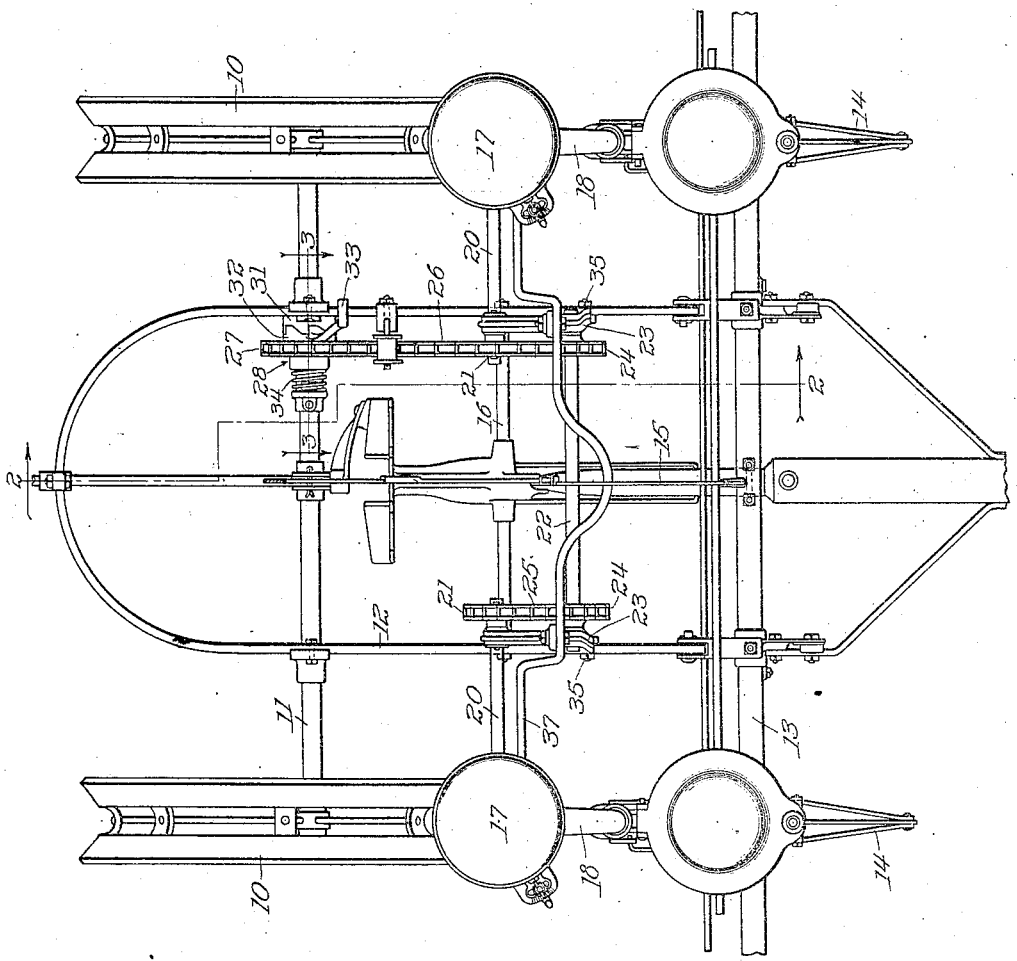
Figure 1 shows a plan view of a corn planter embodying my invention.
Figure 5:
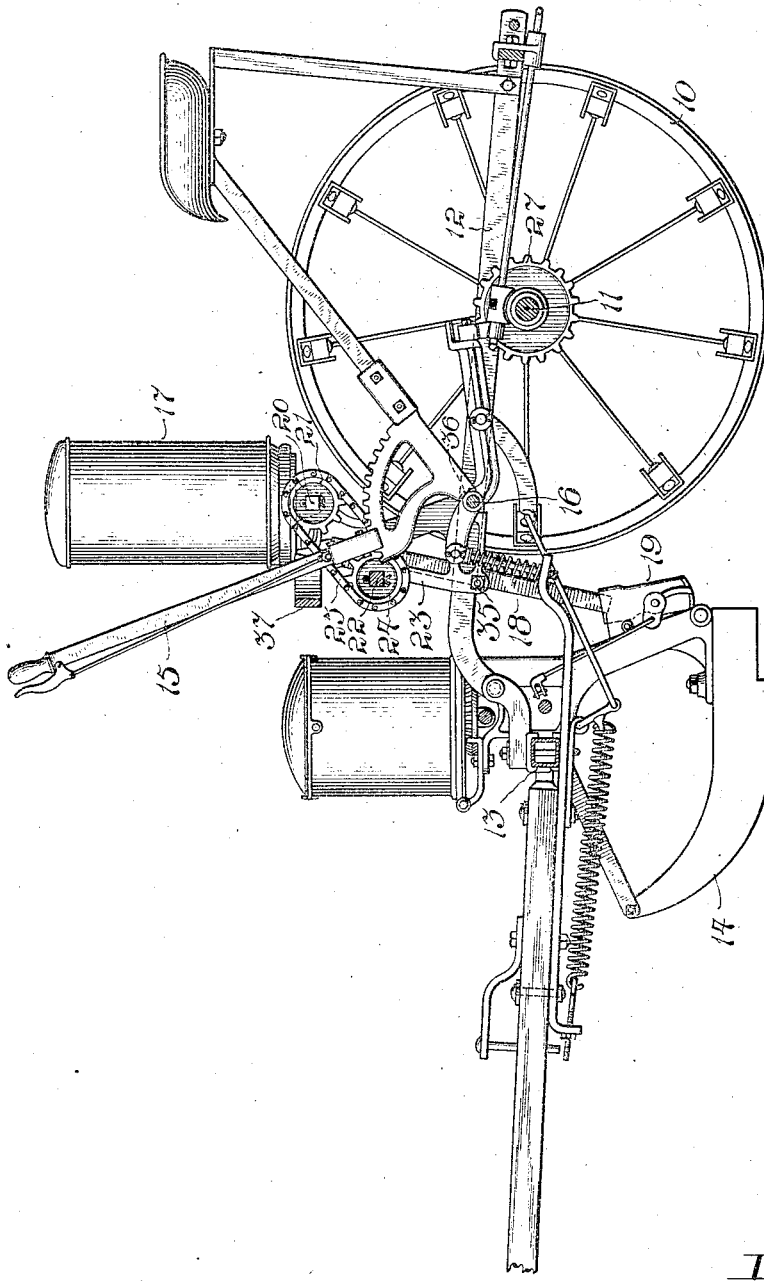
Fig. 5 is a side elevation of part of Fig. 1.

The planter illustrated in the accompanying drawings comprises carrying wheels 10, an axle 11, a main or supporting frame 12 carried on the axle, a furrow opener frame 13 hinged to said supporting frame and carrying furrow openers 14, and a frame adjusting lever 15 pivoted to a transverse shaft 16 arranged forwardly of the carrying frame and secured therein.

The fertilizer attachment comprises containers 17 arranged on opposite sides of the planter, a tube 18 for each of the containers communicating with a valve 19 fixed to the adjacent furrow opener, and a driving mechanism for operating the feeding devices within the containers. The containers 17 occupy positions directly over the front of the carrying or covering wheels 10, and each is provided with a separate feed operating shaft 20 extending inwardly a short distance and provided on its inner end with a sprocket wheel 21. Forwardly of the containers, and a short distance below, is a transversely arranged countershaft 22 carried in brackets 23 detachably secured to the carrying frame of the planter, said brackets also serving as bearing supports for the short shafts 20. On the countershaft are two sprocket wheels 24 arranged in line with the sprocket wheels on the feed operating shafts. On one side of the planter the alined sprocket wheels 21 and 24 are connected together by means of a chain 25, and on the opposite side of the planter a sprocket chain 26, carried on a driving wheel 27 mounted on the axle of the planter, is employed for driving both the countershaft and the remaining feed operating shaft.

A clutch mechanism 28 (shown in Fig.

3) is arranged between the driving wheel 27 and the axle. This mechanism comprises a clutch member 29 fixed to the axle, and a clutch face 30 formed on the driving wheel 27. A cam member 31 is fixed to the adjacent side of the carrying frame, and a coacting cam member 32 is interposed between the cam 31 and the adjacent face of the driving wheel. The cam member 32 is rotatable by means of a pedal 33 and when moved in the proper direction it will slide the driving wheel 27 out of engagement with the fixed clutch member 29. A pressure spring 34 is carried upon the axle and returns the driving wheel to position for reengaging the clutch member 29 when the rotatable cam member is moved to co-acting position with the stationary cam member.

The brackets 28, it will be noted, are pivoted to the carrying frame at their forward ends by means of bolts 35, and at their rear ends they are provided with hooks 36 designed to fit over the shaft 16, and the driving chain 26 serves to hold them in a rigid upright position. This arrangement makes a simple and effective connecting means and one that is capable of quick and easy operation for the purpose of attaching or detaching the fertilizer mechanism. The containers are held in fixed relative position by means of a forwardly curved brace member 37 extending between them and secured thereto.

While I have shown and described but one form of my device, it is to be understood that it is capable of many modifications and changes in the construction and arrangement of the parts may be resorted to without departing from the spirit of my invention as disclosed in the appended claims.

What I claim as my invention and desire to secure by Letters Patent is:

1. In a seed planter, a planter frame, an axle thereon, fertilizer containers carried on said frame, driving means for said containers comprising a feed operating shaft for each of the same, a countershaft arranged forwardly of the feed operating shafts, means connecting one end of the same to one of said feed operating shafts, and driving means connected to the other of said feed operating shafts and to the opposite end of said countershaft and operatively connected to said axle.

2. In a seed planter, fertilizer containers carried on the frame of said planter, driving means for said containers comprising a separate feed operating shaft for each of the containers, a wheel for each of said shafts, a countershaft arranged forwardly of and below said feed operating shafts, wheels on said countershaft in line with the wheels on said feed operating shafts, means for connecting the wheel on one of said feed operating shafts with the alined wheel on the countershaft, and a driving member connected to the axle of the planter and to the remaining alined wheels on the feed shaft and countershaft.

3. In a seed planter, fertilizer containers carried on the frame of said planter, driving means for said containers comprising a separate feed operating shaft for each of said containers projecting inwardly a short distance, a sprocket wheel on the inner end of each of said shafts, a countershaft arranged forwardly and below said feed operating shaft, sprocket wheels on said countershaft in line with the sprocket wheels on the feed operating shafts, a chain connecting the wheel on one of said feed operating shafts with the alined wheel on the countershaft, and a driving chain connected to the axle of the planter and passing over the remaining alined wheels on the feed operating shaft and countershaft.

4. In a seed planter, carrying wheels, an axle for said wheels, a frame on said axle, fertilizer containers carried on said frame, driving means for said containers comprising a feed operating shaft for each of said containers, a countershaft connected to said feed operating shafts, a driving wheel carried on the axle of said planter, means for connecting said driving wheel to said countershaft, and a clutch member arranged between said driving wheel and said axle operable to throw the driving wheel into and out of engagement with the axle.

5. In a seed planter, a frame, an axle thereon, brackets disposed on opposite sides of said planter frame, fertilizer containers carried on said brackets, feed operating shafts for each of said containers rotatably mounted on said brackets, a countershaft journaled on said brackets, and operative connections between said countershaft and feed operating shafts and said countershaft and axle.

In testimony whereof I affix my signature, in the presence of two witnesses.

ARTHUR HOLSEY.

Witnesses:
 EVAN EVANS,
 SAMUEL K. DENNIS.